May 9, 1967 C. T. RESSLER ETAL 3,318,109
BALL BEARING SLIP DRIVE
Filed July 23, 1965
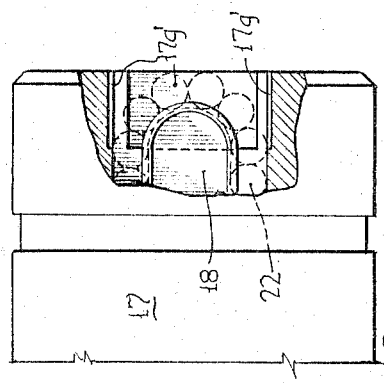
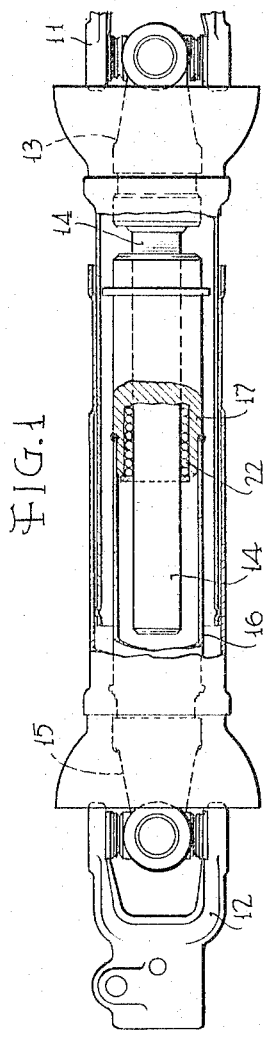
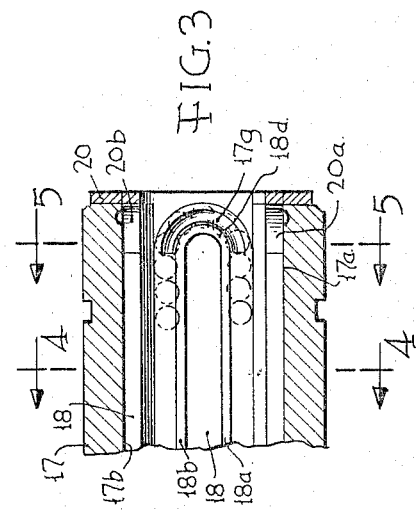
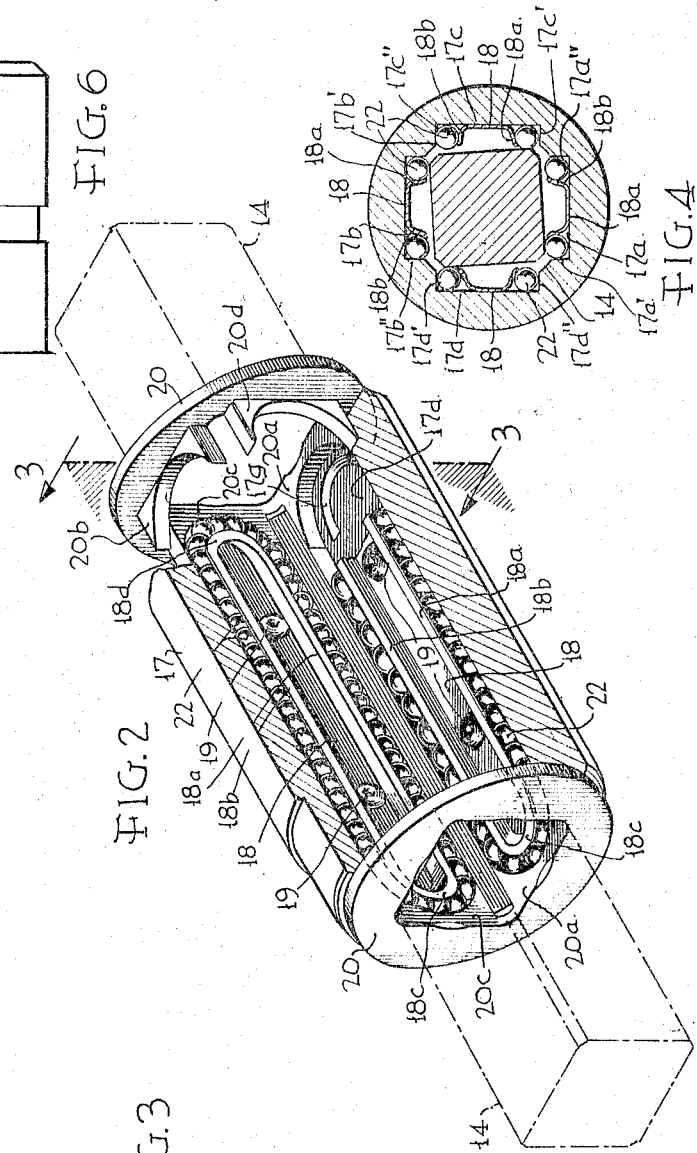
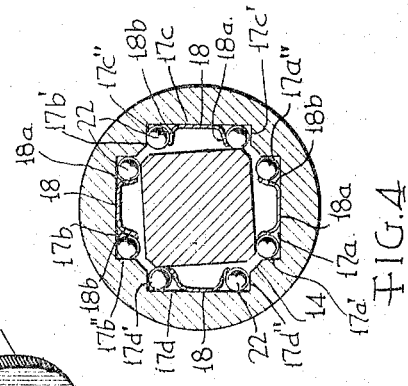
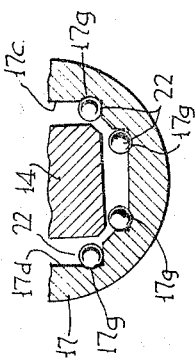

United States Patent Office 3,318,109
Patented May 9, 1967

3,318,109
BALL BEARING SLIP DRIVE
Carl T. Ressler and Paul Mitchell, Pottstown, Pa., assignors to Neapco Products, Inc., Pottstown, Pa, a corporation of Delaware
Filed July 23, 1965, Ser. No. 475,323
7 Claims. (Cl. 64—23)

This invention relates to anti-friction slip drives and has for an object an improved ball bearing slip drive which affords unrestricted telescoping action while under extreme high torque loads.

As pointed out in Ressler et al. Patent No. 2,953,000 it is the practice, for example, in the farm equipment industry to provide drive shafts or take-off shafts from tractors for transmission of power to other farming equipment. Such drive shafts include a pair of universal joints for connecting the power take-off shaft of the tractor with the driven shaft of the auxiliary farming apparatus. It is necessary that the connection or joint between these shafts afford telescoping action. This has been accomplished in the past by using a square shaft and a steel sleeve with a square hole broached through it. With the increase of horse power in tractors in recent years, it has become increasingly difficult to telescope these drives while under extreme high torque loads. The present invention provides an anti-friction slip drive which affords the necessary telescoping action even under extreme high torque loads and the length of slip is not restricted.

In accordance with the present invention there is provided a ball bearing slip drive including a rectangular shaft and a tubular sleeve having an axial passage therethrough adapted to receive the shaft. The passage has its side walls formed by two pairs of opposed channels extending from one end of the sleeve to the other, the bottoms of the channels in each pair being at opposite sides of the passage and parallel to each other and perpendicular to the other pair of opposed channels. A ball retainer is secured in each of the channels and each of the ball retainers comprises an elongated member having straight sides and curved ends, the straight sides of the retainer cooperating with the sides of the channel to provide spaced straight ball races. The sleeve is provided with a pair of end caps having curved portions carried thereby and cooperating with the curved ends of the retainers to provide arcuate ball races which in combination with the respective straight ball races define endless ball paths. A plurality of balls are positioned in the ball races and are movable therein along the endless paths as the sleeve and the shaft move axially relative to each other. The width of each side of the square shaft is sufficiently less than the spacing between the opposed balls in the opposed channels at opposite sides of the sleeve so that when torque is applied to the shaft in either direction four corners of the shaft engage the balls while there is clearance between the other four corners of the shaft and the balls to permit the balls to roll back to the opposite end of the sleeve. The slip drive further includes means providing relief at the arcuate ball races to enable the balls to change direction of movement in the ball paths while free of load.

For a more detailed description of the invention and for further objects and advantages thereof reference is to be had to the following description taken in conjunction with the accompanying drawings in which:

FIG. 1 is a longitudinal view, partly in section, of a ball bearing slip drive embodying the present invention;

FIG. 2 is a perspective view, partly in section, of the ball bearing slip drive shown in FIG. 1;

FIG. 3 is a partial sectional view taken along the plane 3—3 in FIG. 2;

FIG. 4 is a sectional view taken along the plane 4—4 in FIG. 3;

FIG. 5 is a section view taken along the plane 5—5 in FIG. 3; and

FIG. 6 is a partial elevational view of a modification.

Referring to FIG. 1 there is shown a pair of universal joints 11 and 12, one of which is adapted to be connected to the power take-off shaft from the source of power and the other of which is adapted to be connected to the shaft of the driven apparatus. The universal joint 11 includes a yoke member 13 secured to a rectangular solid hardened steel shaft 14 which, preferably, is square in cross section. The other universal joint 12 includes a yoke member 15 which is secured to a tubular member 16 the opposite end of which supports a tubular sleeve 17 of the ball bearing slip drive.

As may be seen in FIGS. 1 and 2 the tubular sleeve 17 has an axial passage therethrough adapted to receive the shaft 14. The side walls of the passage are formed by two pairs of opposed channels 17a, 17b and 17c, 17d extending from one end of the sleeve 17 to the other. It will be seen that the bottoms of the channels in each pair 17a, 17b and 17c, 17d are at opposite sides of the passage and parallel to each other and that the bottoms of the channels 17a, 17b are perpendicular to the bottoms of the channels 17c, 17d. Four ball retainers 18 are provided with one retainer 18 being secured to the bottom of each of the four channels 17a–17d respectively. As may be seen in FIG. 2 the ball retainers 18 are adapted to be secured in place in any suitable manner such as by rivet members 19. Each ball retainer 18 comprises an elongated member having a pair of straight sides 18a, 18b and a pair of curved or arcuate ends 18c, 18d, FIG. 2. As may be seen in FIG. 4 the straight sides 18a and 18b of the retainers 18 are provided with a lip portion as shown in cross section so that the straight sides 18a and 18b of the retainers cooperate with the corresponding sides 17a'–17d' and 17a"–17d" to provide eight parallel spaced straight ball races.

The opposite ends of the tubular sleeve 17 are provided with a pair of end caps 20, FIG. 2. The end caps 20 are each provided with longitudinally extending curved or arcuate portions 20a–20d which cooperate with the curved or arcuate ends 18c and 18d of the retainers 18 to provide arcuate ball races which in combination with the respective straight ball races define four endless ball paths. A plurality of balls 22 are disposed in the ball races and movable therein along the endless paths as the sleeve 17 and the shaft 14 move axially relative to each other. There is no restriction on the length of slip between members 14 and 17 as the balls 22 roll and do not slide.

The width of each side of the shaft 14 is sufficiently less than the corresponding spacing between the opposed balls in the opposed channels at opposite sides of the sleeve 17 so that when torque is applied to the shaft 14 in either direction four sides of the shaft 14 adjacent the four corners thereof will engage the balls 22 in the four corresponding straight ball races while there is clearance between the other four sides of the shaft 14 adjacent the four corners and the balls 22 in the other four straight ball races to permit the balls to slide back to the opposite end of the sleeve 17. Although not limited thereto, it has been found in one embodiment that this action may be achieved by providing approximately .012 inch or more clearance between the shaft 14 and the balls 22. With this clearance it can readily be seen, FIG. 4, that when torque is applied in either direction the alternate four sides of the shaft 14 at each of the corners come in contact with one row of balls 22 in corresponding races. The opposite sides of the corners of the shaft 14 thus have clearance so that the balls 22 in the other corresponding races can roll back to the opposite end of the shaft during the telescoping action. In order that the balls 22 can change direction without having a load on them the opposite ends of each channel 17a–17d are provided with relief areas adjacent the arcuate ball races. As may be seen in FIGS. 2 and 3 the relief areas have been illustrated in the form of arcuate grooves 17g which are adapted to be coined in the ends of the bottoms of each of the channels 17a–17d. The relief areas 17g have a cross section in the form of an arcuate groove the depth of which by way of example in one embodiment was in the order of .006 inch to .010 inch. The relief areas 17g are important as they decrease the pressure on the end caps 20 and avoid scoring of the arcuate raceways from the pressure of the balls 22 as they change their direction of roll during a telescoping action. Without the relief areas 17g it was found that the arcuate raceways became scored within a very short period of time.

An alternative form of relief area is shown in FIG. 6 where the relief areas 17g' are in the form of straight notches extending inwardly from both ends of the tubular sleeve 17 and formed in the bottoms of the four channels 17a–17d at locations corresponding to the relief areas 17g in FIGS. 2 and 3. The relief areas 17g' in a particular embodiment had an axial dimension of approximately 9/16 inch a transverse dimension of approximately 5/16 inch and a depth of about .010 inch or more.

In FIG. 5, which is a section along the line 5—5 in FIG. 3 it will be seen that the balls 22 at the bottom of the figure are resting in the opposite ends of the relief groove 17g in the bottom of channel 17a. A cross section of the relief groove 17g in the bottom of channels 17c and 17d are also shown in FIG. 5. This figure clearly shows the clearance between the shaft 14 and the balls 22 which is achieved at the arcuate races by means of the relief area 17g or the areas 17g' as shown in FIG. 6.

It is to be understood that the invention is not limited to the specific arrangements shown and that further modifications thereof may be made within the scope of the appended claims. For example, the shaft 14 may be of other flat sided standard geometric cross section having at least three sides, as a triangle, pentagon, hexagon, etc. Where the cross section of the shaft is other than a rectangle the width of the flat sides should be equal as well as the angles, that is to say the cross section should be a regular polygon. It will likewise be understood that the passage in the tubular sleeve 17 will be provided with a corresponding number of channels each with an endless path for the balls similar to the construction shown herein for sleeve 17.

What is claimed is:

1. A ball bearing slip drive comprising a rectangular shaft,
    a tubular sleeve having an axial passage therethrough adapted to receive said shaft,
    said passage having its sidewalls formed by two pairs of opposed channels extending from one end of said sleeve to the other, the bottoms of said channels in each pair being at opposite sides of said passage and parallel to each other and perpendicular to said other pair of opposed channels,
    a ball retainer secured in each of said channels,
    each said ball retainer comprising an elongated member having straight sides and curved ends, said straight sides of said retainer cooperating with the sides of said channel to provide spaced straight ball races,
    a pair of end caps for said sleeve,
    curved portions carried by said end caps and cooperating with said curved ends of said retainers to provide arcuate ball races which in combination with said respective straight ball races define endless ball paths,
    a plurality of balls in said ball races and movable therein along said endless paths as said sleeve and said shaft move axially relative to each other,
    the width of each side of said shaft being sufficiently less than the spacing between the opposed balls in said opposed channels at opposite sides of said sleeve so that when torque is applied to said shaft in either direction four corners of said shaft engage said balls while there is clearance between the other four corners of said shaft and said balls to permit said balls to roll back to the opposite end of said sleeve without restricting the length of slip of said shaft relative to said sleeve, and
    means providing relief at the arcuate ball races to enable said balls to change direction of movement in said ball paths while free of load.

2. A ball bearing slip drive according to claim 1 wherein said means for providing relief comprises an arcuate groove formed in the bottom of the opposed pairs of channels at the opposite ends thereof, said arcuate grooves corresponding to the arcuate shape of said arcuate ball races.

3. A ball bearing slip drive according to claim 1 wherein said means providing relief at the arcuate ball races comprises a recessed area formed in the bottom of each of the opposed pairs of channels at the opposite ends thereof and adjacent said curved ends of said retainers.

4. A ball bearing slip drive according to claim 1 wherein said rectangular shaft is square in cross section.

5. A ball bearing slip drive comprising
    a shaft the cross section of which is a regular polygon,
    a tubular sleeve having an axial passage therethrough adapted to receive said shaft,
    said passage having its sidewalls formed by channels corresponding in number to the number of sides of said shaft and extending from one end of said sleeve to the other,
    a ball retainer secured in each of said channels,
    each said ball retainer comprising an elongated member having straight sides and curved ends, said straight sides of said retainer cooperating with the sides of said channel to provide spaced straight ball races,
    a pair of end caps for said sleeve,
    curved portions carried by said end caps and cooperating with said curved ends of said retainers to provide arcuate ball races which in combination with said respective straight ball races define endless ball paths,
    a plurality of balls in said ball races and movable therein along said endless paths as said sleeve and said shaft move axially relative to each other,
    the width of each side of said shaft being sufficiently less than the spacing between the opposed balls in said corresponding channels of said sleeve so that when torque is applied to said shaft in either direction alternate corners of said shaft engage said balls while there is clearance between the other alternate corners of said shaft and said balls to permit balls to roll back to the opposite end of said sleeve without restricting the length of slip of said shaft relative to said sleeve, and
    means providing relief at the arcuate ball races to enable said balls to change direction of movement in said ball paths while free of load.

6. A ball bearing slip drive according to claim 5 wherein said means for providing relief comprises an arcuate groove formed in the bottom of the opposed pairs of channels at the opposite ends thereof, said arcuate grooves corresponding to the arcuate shape of said arcuate ball races.

7. A ball bearing slip drive according to claim 5 wherein said means providing relief at the arcuate ball races comprises a recessed area formed in the bottom of each of the opposed pairs of channels at the opposite ends thereof and adjacent said curved ends of said retainers.

References Cited by the Examiner
UNITED STATES PATENTS

| | | | |
|---|---|---|---|
| 1,690,714 | 11/1928 | Braddock | 64—23 |
| 1,918,108 | 7/1933 | Jonkhoff | 64—23 |
| 2,791,894 | 5/1957 | Duckworth | 64—23.7 |
| 3,143,867 | 8/1964 | Anderson | 64—23 |

References Cited by the Applicant
UNITED STATES PATENTS

| | | |
|---|---|---|
| Re. 25,489 | 11/1963 | Anderson. |
| 2,160,516 | 5/1939 | Pranger. |
| 2,929,661 | 3/1960 | Brown. |
| 2,952,145 | 9/1960 | Thompson. |
| 2,981,570 | 4/1961 | White. |

FRED C. MATTERN, Jr., *Primary Examiner.*

H. C. COE, *Assistant Examiner.*